June 15, 1965 A. W. BRIDGETT 3,189,889

SYSTEM FOR MODIFYING STORED DATA

Filed Jan. 2, 1962 3 Sheets-Sheet 1

INVENTOR.
ARGYLE W. BRIDGETT
BY [signature]
ATTORNEY

INVENTOR.
ARGYLE W. BRIDGETT
BY [signature]
ATTORNEY

SYSTEM FOR MODIFYING STORED DATA

Filed Jan. 2, 1962

3 Sheets-Sheet 3

INVENTOR.
ARGYLE W. BRIDGETT

BY [signature]

ATTORNEY 3,189,889
Patented June 15, 1965

3,189,889

SYSTEM FOR MODIFYING STORED DATA

Argyle W. Bridgett, Newton, Mass., assignor to Image Instruments Inc., Newton, Mass., a corporation of Delaware Filed Jan. 2, 1962, Ser. No. 163,400
19 Claims. (Cl. 340—324)

This invention relates to the handling and use of stored data, and more particularly to systems for displaying electrically- and electronically-stored data patterns and modifying such patterns at the will of an observer.

Within the last decade information handling systems which include data storage devices have come into use, and such use is expected very soon to become widespread. Such data storage devices include electron storage tubes, which store data in the form of incremented charges on a two-dimensional charge storage screen, magnetic storage devices ranging from magnetic tapes to magnetic drums used for memory storage in large scale computers, and arrays of matrices of magnetic ferrite elements. It is a general object of the present invention to provide systems for generating, or modifying all or any incremental part of, stored data patterns. A more particular object is to provide such systems including means to display visually data patterns stored in such data storage devices in which an observer or an operator can modify at will all or any incremental part of such a stored data pattern.

Pursuant to this general object, there is provided according to the invention a system for modifying stored data comprising, signal storage means having a plurality of signal storage loci, signal write means arranged to scan said loci in a time sequence, a two-dimensional visual display device having a display area and display-scanning means arranged to scan increments of said area in a time sequence, detector means adjustable to detect the presence of said display-scanning means at a discrete element of said display area, and means operatively interconnecting said detector means with said signal write means to establish a signal in said storage means in one or more loci corresponding to said discrete element.

As will be more fully set forth below, such a system has utility for numerous purposes. For example, information being processed according to a computation program may, with such a system, be observed at a storage point in the program, and the observer can at will alter all or any incremental part of the stored data pattern. As another example, if the stored information consists of isolated increments of data concerning a functional relationship between two or more variables, visual observation of the stored data pattern may permit the observer to appreciate the nature of the function involved, and such a system will then make it possible to write into the stored data pattern additional increments of information to complete the stored data pattern in accordance with the observer's conclusion.

From another point of view, the invention provides a system including a visual display device and a data storage device arranged so that an operator may mark or erase any selected portion of the display device by establishing and selectively altering a stored data pattern in the storage device. According to this aspect of the invention, there is provided, in a visual information display system having a two-dimensional display device characterized by a display area and display-scanning means adapted to scan increments of said area in a time sequence, a system for marking a discrete increment of said display area comprising, said display device, signal storage means having a plurality of signal storage loci, time sequential write means arranged to scan said loci, detector means adjustable to detect the presence of said display scanning means at a discrete element of said display area, means operatively interconnecting said detector means with said write means to establish a signal in said storage means in one or more loci corresponding to said discrete element of said display area, and means operatively interconnecting said storage means with said display scanning means.

In systems according to the invention, signal storage means may be realized in, but are not limited to, any of the aforementioned data storage devices. Two-dimensional visual display devices may take the well-known form of a cathode-ray tube, although it should be understood that other forms, for example, banks of lights equipped with switch-type sequential scanning means, or luminescent panels equipped with means to scan a voltage pulse over the panel in a prescribed raster, are included in the scope of the invention. Detector means may likewise take any suitable form such as some of the known light guns embodying photoelectric cell-type detecting elements. It is accordingly another object of the invention to provide systems according to the invention which can be realized in, and applied to, various forms of the component forms thereof, whether or not such parts are now in existence.

The foregoing and other objects and features of the invention will be better appreciated from the following description of certain embodiments thereof. This description refers to the accompanying drawings, wherein.

Figure 1:
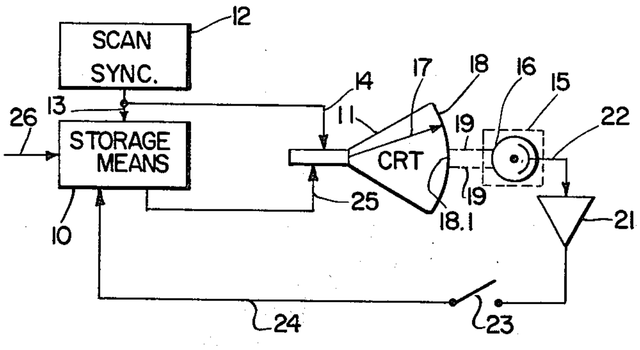
FIG. 1 illustrates in block form a general system according to the invention.
Figures 4, 4A, 5:
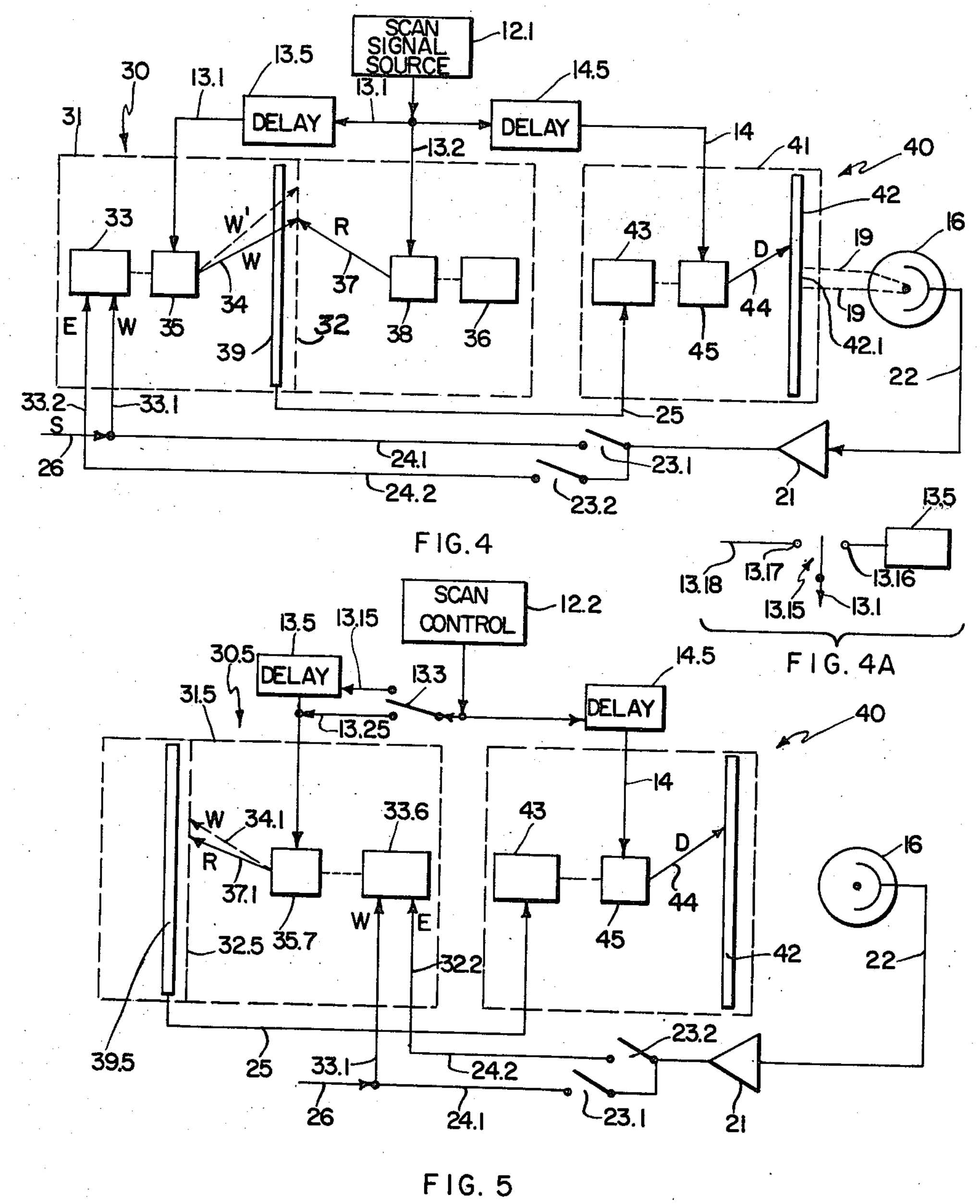
FIG. 4 illustrates a system according to FIG. 1 employing a double-ended storage tube.
FIG. 4A is a modification of FIG. 4.
FIG. 5 illustrates a system according to FIG. 1 employing a single-ended storage tube.
Figure 6:
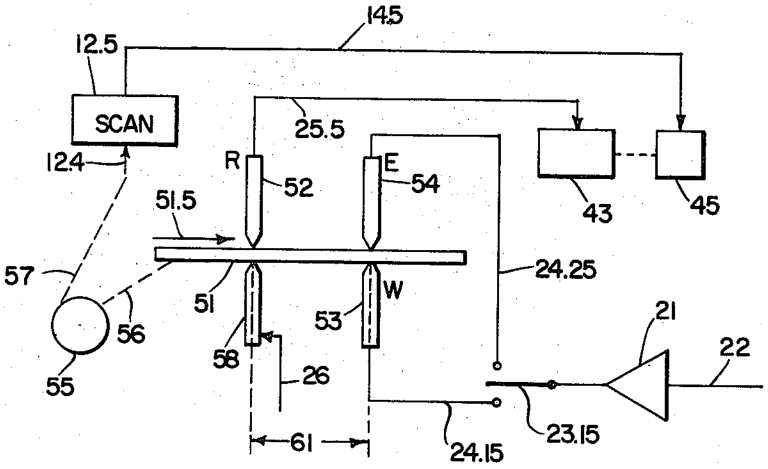
FIG. 6 illustrates in part a system according to FIG. 1 employing a magnetic-tape type signal storage means.

Referring to FIG. 1, a storage means 10, examples of which are illustrated in FIGS. 4, 5 and 6, and a display device in the form of a cathode ray tube 11, are adapted to be scanned under the common control of a scan synchronizing circuit 12 via connecting lines 13 and 14, respectively. The block 12 representing a scan synchronizing circuit may be any form of circuit which provides, or which generates and provides, a scanning voltage or current to the storage means 10 and the cathode ray tube 11. A brightness control signal is fed from the storage means 10 to the cathode ray tube 11 over a line 25. A signal input terminal 26 is provided for the storage means. A detector represented by a dotted-line rectangular box 15 includes a photocell 16 which is adapted to detect the presence of the electron beam 17 of the cathode ray tube at a chosen increment 18.1 of the display screen 18 of the cathode ray tube, bounded between dotted lines 19 which represent the cone of vision presented to the photocell 16. The output of the photocell 16 is fed to an amplifier 21 over a line 22 and then via a switch 23 and detector signal output line 24 as a second input to the storage means 10.

FIG. 4 shows diagrammatically and in greater detail a system according to FIG. 1 employing a double-ended storage tube 30 as the storage means. Like parts in these two figures bear the same reference characters. The storage tube is enclosed by a dotted-line box 31 representing its envelope, and includes a storage screen 32, write gun 33 adapted to provide a write beam indicated at 34, write beam deflection means 35, read gun 36 adapted to provide a read beam indicated at 37, read beam deflection means 38, and an output signal collector electrode 39. An example of a double-ended storage tube having this general organization is shown and described in U.S. Patent No. 2,547,638. A dotted-line box 41 represents the envelope of a cathode ray tube 40, enclosing a screen 42, an electron gun 43 adapted to provide a cathode ray display beam indicated at 44, and beam deflection means 45. A scan signal source 12.1, corresponding to the scan synchronizing circuit in FIG. 1, is connected via lines 13.1 and 13.2 to the write and read deflection means 35 and 38, respectively, and via line 14 to the cathode ray tube deflection means 45. Scan signal delay means 13.5 and 14.5 are provided in lines 13.1 and 14, respectively, for optional use as will be described below. The storage tube output signal collector electrode 39 is connected via the brightness input line 25 to the electron gun 43 of the cathode ray tube 40. The detector photocell 16 is connected via the output line 22 and amplifier 21 to two switches 23.1 and 23.2 in parallel. The first switch 23.1, which may be called the "write switch," is adapted to connect the amplified output of the photocell via line 24.1 to a first input line 33.1 to the write gun 33 of the storage tube 30, and the second switch 23.2, which may be called the "erase switch," is adapted to connect said output via an alternative line 24.2 to a second input line 33.2 to the write gun 33. The first input line 33.1 (labelled "W") is adapted to cause the write gun to provide a beam 34 which writes a signal onto the storage screen 32, and may therefore be called the "write input line," while the second input line 33.2 (labelled "E") is adapted to cause the write gun to provide a beam 34 which erases a signal on the storage screen 32, and may therefore be called the "erase input line." The aforementioned U.S. Patent No. 2,547,638 shows one well-known arrangement for optionally writing or erasing with the same gun in a storage tube; other means and organizations for accomplishing this purpose are known to the storage tube art, and therefore none is herein described. The signal input line 26 is connected to the write input line 33.1 to the write gun 33.

The operation of the system shown in FIG. 4, under the conditions set forth immediately following, which do not involve the use of the scan signal delay means 13.5 and 14.5, will next be described. The lines 13.1 and 14 from the scan signal source to the write deflection means 35 and to the cathode ray tube deflection means 45, respectively, should, under this condition, be viewed as though such delay means were absent, so that signals from the scan signal source arrive simultaneously at all three deflection means 35, 38 and 45. It is also assumed that: the write beam 34 (W) and the read beam 37 (R) simultaneously scan the same increment or signal locus of the storage screen 32, and the display beam 44 (D) of the cathode ray tube 40 simultaneously scans a corresponding increment of the display screen 42; that the scan signal source 12.1 provides scanning raster signals similar to those used in television, as is shown in FIG. 2, namely, a series of horizontal traces 42.5 occurring sequentially from the top to the bottom of the screen 42; and that the intensity of the display beam 44 is adjusted (by means which are well-known and hence not described herein) so that it produces on the screen 42 an intensity of background illumination which is at least detectable by the photocell 16 in the absence of a corresponding signal on the storage screen 32.

Figure 2:
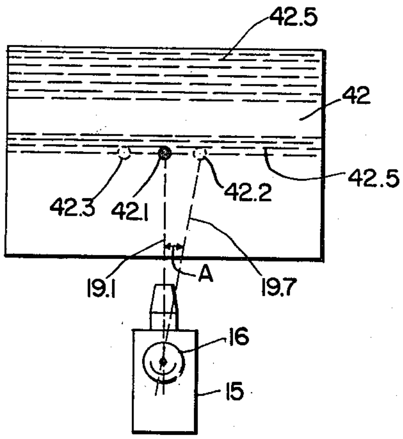
FIG. 2 illustrates diagrammatically a detector portion of a system according to FIG. 1 employing a cathode-ray tube as a display device.

Under these conditions, the observer may aim the detector so that the photocell 16 is adapted to observe the increment 42.1 of the display screen 42, as is shown in FIGS. 2 and 4. In FIG. 2, the detector 15 is shown with the axis 19.1 of its cone of vision aimed directly at the increment 42.1, which is shown as an enlarged dot on the screen 42. Since the display beam 44 produces detectable background illumination of the screen 42, when the display beam passes through the observed increment 42.1 an electrical pulse signal will be developed in the photocell 16; this signal is amplified by the amplifier 21. If the write switch 23.1 has been closed, at least just prior to the arrival of the display beam 44 at the observed increment 42.1, this amplified pulse is passed to the write input line 33.1 of the storage tube 30. The write beam 34 then writes a signal into the storage screen 32, which signal is substantially simultaneously read out by the read beam 37, over the output signal collector electrode 39 and the brightness input line 25 to cathode ray tube 40, where it causes an increase in brightness of the obsreved increment 42.1 of the display screen 42. It is assumed that the reading out of this signal from the storage screen 32 causes only negligible degradation of the signal in the storage screen; the conidtions under which this type of readout can be achieved are well known, and examples of such conditions are set forth int he aforementioned U.S. Patent No. 2,547,638. Thus, by merely aiming the detector 15 at the observed increment 42.1 of the display screen 42, and closing the wire switch 23.1, the observer may cause a bright spot to appear at that increment, and this may be done without the input to the storage tube 30 of any signal over the input line 26. It will now be apparent that, by closing the erase switch 23.2, and aiming the detector 15 at the same increment 42.1 of the display screen 42, the observer can cause this bright spot to disappear, or to be erased. Thus, the system of FIG. 4 can be used to write on or erase from the storage screen 32, at will, and completely electronically. A series of bright spots, constituting one or more lines, or other graphic data, can be achieved by colsing the write switch and moving the axis 19.1 of the cone of vision over the display screen in a desired path. This system thus affords an electronic "slate" or "blackboard." After this slate or blackboard has been written on, the written (i.e., stored) data will remain through repeated scansions of the respective beams 34, 37 and 44, due to the persistence of signals in the storage screen 32, until the observer chooses to erase the stored data or any part thereof, by use of the erase switch 23.2 in place of the write switch 23.1.

In a practical system according to FIG. 4, it will take a small time interval, approximately 0.2 microsecond, to generate a signal in the photocell 16, and to amplify this signal in the amplifier 21, so that the amplified signal will be presented at the write input line 33.1 of the storage tube about 0.2 microsecond after the display beam 44 has passed the observed increment 42.1 of the display screen 42. Referring to FIG. 2, the display beam 44 may be persent at another subsequently reached increment represented by a dotted circle 42.2 at the instant when the signal from the observed increment 42.1 is being presented to the write input line 33.1. If, as will happen under the conditions set forth above, the write, read and display beams are simultaneously tracking the same or corresponding loci or increments of their respective screens, the write beam 34 will be at a locus on the storage screen 32 corresponding to the subsequently-reached increment 42.2 of the display screen 42 when the signal corresponding to the observed increment 42.1 is presented to the write input line, with the result that the subsequently-reached increment 42.2 will be made brighter, rather than the observed increment 42.1. This is an undesirable result, for which compensation can be achieved in different ways, two of which are described below.

Figure 3:
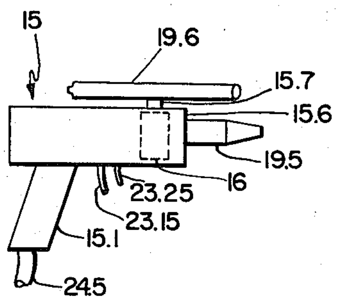
FIG. 3 illustrates diagrammatically a light gun as contemplated for use with FIG. 2.

Referring to FIGS. 2 and 3, the detector 15 is in the form of a "light gun," many forms of which are presently known. Examples of light guns designed for the purpose of detecting the presence of radiant energy at an increment of a display screen are shown and described in U.S. Patent Nos. 2,903,690 and 2,915,643. In FIG. 3 there is shown a light gun which bears a general resemblance to the gun shown in Patent No. 2,903,690. The cone of vision 19—19 is established by a light-conductor rod 19.5 which is similar to the rod 6 of that patent; the axis of this rod corresponds to the sighting axis 19.1 in FIG. 2. The gun 15 has a handle 15.1 for convenience, triggers 23.15 and 23.25 for controlling the switches 23.1 and 23.2, respectively, and a signal cable 24.5. As in the case of Patent No. 2,903,690, the amplifier 21 can be contained within the housing 15.6 of the gun 15, and in that case the cable 24.5 will include power conductors for the amplifier as well as the signal lines 24.1 and 24.2.

In adidtion to the foregoing structural details, the gun 15 shown in FIG. 3 has mounted on top of its housing 15.6 a sighting device 19.6, which may be similar to a telescopic gunsight. This sighting device is mounted on a pivotal support 15.7 which enables the sighting device to be pivoted around an axis which is perpendicular to the observation axis 19.1. The sighting device 19.6 can thus be adjusted so that its optical axis 19.7 makes an angle A with the sighting axis 19.1 of the gun 15. For a given distance along the sighting axis 19.1 between the display screen 42 and the gun 15, an angle A can be found such that the distance between the sighting axis 19.1 and the optical axis 19.7 at the display screen 42 is equal to the distance between the increments 42.1 and 42.2 of this screen. If now, while maintaining said given dstance, the gun 15 is sighted through the sighting device 19.5 at the observed increment 42.1, the photocell 16 will actually look at an increment 42.3 which will be reached by the display beam 44 an interval of time prior to reaching the observed increment 42.1, which time interval is equal to the signal delay from the gun to the write input line 33.1. In order to establish the angle A between the gun and sighting device axes, it is only necessary to know the distance on the display screen 42 which corresponds to this delay.

Compensation for the signal delay between the detector 15 and the write input line 33.1 can be achieved electronically by including the scan signal delay means 13.5 in the write gun scan signal line 13.1, as is shown in FIG. 4. If the signal delay from the detector to the write input line is 0.2 microsecond, then this scan signal delay means introduces an identical time delay in the write gun scan signal line, so that the write beam 37 follows at a position W' which is 0.2 microsecond behind the read gun 37. Thus, the write beam 37 arrives at the position W corresponding to the observed increment of the display screen simultaneously with the arrival of the corresponding signal pulse at the write input line 33.1 from the the detector 15. In this case, the angle A (in FIG. 2) is set at zero degrees.

It is conceivable that a system according to FIG. 4 may be realized in which there is a significant time delay in transferring a signal from the storage tube output signal collector electrode 39 to the electron gun 43 of the cathode ray tube 40. If such a time delay is experienced, compensation for it can be provided with a second scan signal delay means 14.5 in the display beam scan signal line 14, as is shown in FIG. 4.

FIG. 5 shows a system which is similar in many respects to that of FIG. 4, but employs a single-ended storage tube 30.5 in place of the double-ended storage tube 30 of FIG. 4. A single-ended storage tube is shown in the aforementioned U.S. Patent No. 2,547,638. Like parts of both figures bear the same reference characters. The single-ended storage tube 30.5 contains within its envelope 31.5 a single electron gun 33.6 and a beam deflection means 35.7 associated therewith. The storage screen 32.5 and output signal collector electrode 39.5 correspond to the screen 32 and output electrode 39 of FIG. 4. A scan control circuit 12.2, which may be the same as the scan signal source 12.1 or FIG. 4, supplies scan signals to the beam deflection means 35.7 of the storage tube and to the display beam deflection means 45 of the cathode ray tube 40. Scan signals to the storage tube 30.5 are supplied to a scan control switch 13.3, which can be closed on a write scan line 13.15 or on a read scan line 13.25. The write scan line includes the scan signal delay means 13.5, so that scanning of the write beam 34.1 (W) is delayed relative to starting of the read beam 37.1 (R) by the time interval which is equal to the signal pulse time delay in the path 22–21–23.1–24.1 from the photocell 16 to the write input line 33.1. In each scanning or frame of the storage and display screens 32.5 and 42, time "zero" is established by the start of the scanning of the read beam 37.1 The delay means 14.5 in the display beam scan line 14, if used, is the same as in FIG. 4. Thus, with the scan control switch 13.3 closed on the read scan line 13.25, the system of FIG. 5, for reading, is functionally identical with that of FIG. 4. Alternatively, with the scan control switch 13.3 closed on the write scan line 13.15, the system of FIG. 5, for writing, is functionally identical with the system of FIG. 4 including the write scan signal delay means 13.5. As in FIG. 4, the scan signal delay means can be omitted, if desired, and the modification of FIGS. 2 and 3 can be used with the system of FIG. 5, if desired.

It will be understood that the particular signal detector 15 which is shown and described herein is exemplary only of one suitable form of detector. Other forms may be substituted, if desired.

FIG. 6 shows a system according to the invention in which a magnetic type of signal storage means is used. In this embodiment of the invention, a cathode ray tube display device, as in FIGS. 4 and 5 is used; however, for simplicity, only the electron beam gun 43 and deflection means 45 of the cathode ray tube are shown in FIG. 6, the remaining parts being the same as in FIG. 4. So also, the line 22 from the display signal detector, and the display signal amplifier 21 are shown, but the detector 15 is omitted, since it is the same as in FIG. 4 or FIG. 5. The magnetic storage medium is represented by a section of a tape 51, but it will be appreciated that this is representative of magnetic drums, discs and all other forms of magnetic storage devices in which the magnetic storage medium is movable relative to read, write, erase and write heads 52, 53, 54 and 58, respectively, or vice versa. The tape 51 is driven by a motor 55 through mechanical means represented by a dotted line 56 linking the motor with the tape. A scan circuit 12.5, for controlling the deflection of the cathode ray beam (not shown) over the line 14.5 connected to the cathode ray tube deflection means 45 is triggered at appropriate moments by means (not shown); such means may be associated with the motor 55 as represented by a dotted line 57 linking the motor with the scan circuit via the scan trigger signal input line 12.4; alternatively, scan trigger signals may be stored on the magnetic medium 51. The amplified display signal may be fed to the first write head 53 via the switch 23.15 closed on the display-write input line 24.15, or alternatively to the erase head 54 via the same switch closed on the display-erase line 24.25. This switch is in the neutral position shown in FIG. 6 when not closed on one or the other of these two lines 24.15 or 24.25, respectively.

In operation, the motor 55 drives the tape 51 in the direction of the arrow 51.5 shown adjacent the tape in FIG. 6. Signals are read out of the tape with the read head 52 and fed via a line 25.5 to the cathode ray tube gun 43. When it is desired to write a signal representative of an increment of the display tube screen (not shown) into the tape, the display signal switch 23.15 is closed on the display signal write line 24.15 and that increment of the display screen is observed, as in FIG. 4 or FIG. 5.

The spacing 61 between the read head 52 and the display signal write head 53 is chosen to compensate for the time delay imposed on the display signal in detection, amplification and transmission to the write head 53, as is explained above in connection with FIG. 4. If erasure is desired, the display signal switch is closed on the display signal erase line 24.25 instead. The display signal erase head 54 is located the same distance 61 from the read head 52 as the display signal write head 53, for the same reason. A second write head 58 may be located closely adjacent the read head, or in any other desired location, for the purpose of writing in data over the external signal input line 26. The display signal write head 53 may be used for this purpose, if desired, but this will impose a need to adjust reading operations for the difference in relative positions of the read and write heads with respect to the storage medium. Similar considerations apply to the use of the erase head 54 for selective erasure of stored data. It will be appreciated that the system illustrated in part in FIG. 6 is functionally similar to the system of FIG. 4.

Figure 7:
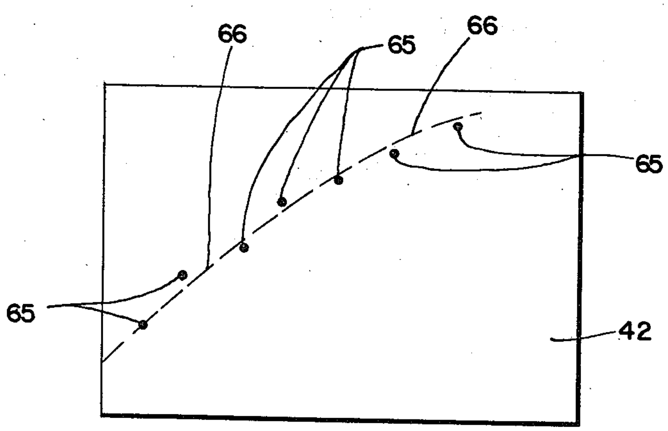
FIG. 7 illustrates a use of the invention as a visual graph marker.

FIG. 7 illustrates a use of systems according to the invention, for example, as shown in FIG. 4, 5 or 6. It is assumed that data is presented via the external-data input line 26, which data is a series of discrete samples representative of discrete values of one variable quantity with respect to another variable quantity, and these samples are presented as a series of dots 65 on the display screen 42. It is assumed further that the dots are presented in a set of coordinates which enable the dots to represent the functional relationship between the two variable quantities; for example Cartesian coordinates may be used in which a vertical side of the display screen corresponds to the ordinate (Y-axis) and a horizontal side corresponds to the abscissa (X-axis). Then, by inspecting the dots 65, an observer can "draw" on the display screen 42 a curve 66 which he believes represents this functional relationship, simply by sweeping the viewing axis 19.1 of the gun 15, for example, across the display screen in the path of the curve 66. If the delay correction arrangement of FIG. 2 is used, the observer will sweep the skewed axis 19.7 in this path, as is evident from the foregoing description of the operation of FIG. 2. Should the continued accumulation of points 65 show that one point represents a clearly erroneous reading, the observer can "erase" that point by aiming the detecting device 15 at it and closing the erase switch (23.2 in FIG. 4 or FIG. 5, for example). Any part of the display screen can be written on or erased at will; more fundamentally, any increment of the data stored in the storage means (10 in FIG. 1, 30 in FIG. 4, 30.5 in FIG. 5, or 51 in FIG. 6) can be modified at will, for the display means merely presents visually the stored data. Thus, if the stored data represents quantities intended for further handling, as in a computer, systems of the invention make it possible to inspect the data, and to alter it in part or in whole prior to allowing it to proceed to the next stage in the computer or in the handling program. As another alternative, the stored data data can be compared with data written into the system by an observer, who can write additional data so that it appears in another location on the display screen 42, for example.

Modern computers and data handling systems rely heavily on memory devices to store data for future handling or simply for information purposes. Delay lines are commonly used as memory elements. By connecting the output of a delay line to the external input signal line 26 (FIG. 1, 4, 5 or 6) of a system according to the invention, the data stored therein can be read into the system and inspected without in any way interfering with the operation of the computer or data handling system being inspected. In this way, data stored in the memory of such a computer or data handling system can be supervised, examined and, if desired, altered; for example a detail in a program can be altered without affecting the rest of the program.

It will be apparent to those skilled in the art that the storage means represneted in FIG. 6 could itself be a delay-line type of storage means, in which the signals themselves travel in the direction of the arrow 51.5, and element 51 represents a delay line, rather than a moving magnetic tape. In that case the units 52, 53, 54 and 58 would represent devices adapted to couple with the delay line, rather than magnetic tape coupling devices.

It will also be understood that in any of the illustrated systems of the invention, complete erasure of the displayed data can be achieved by erasing the stored data. The aforementioned U.S. Patent No. 2,547,638 shows how to do this in storage tubes. It is also well-known to erase an entire magnetic storage medium through the use of an erase head.

Referring to FIG. 4, it will be appreciated that the write beam 34 need not be synchronized with the read beam 37 except when it is desired to alter the data pattern in the storage screen 32. At other times the write beam 34 may be separately controlled, independently of the read beam 37, receiving its signals over the separate input signal line 26; at such other times the write scan line 13.1 may be connected to a scan signal source (not shown) other than the scan signal source 12.1 shown in FIG. 4. It should be noted, however, that simultaneously, the read beam 37 may continue to scan the storage screen 32 and present the stored data pattern to the cathode ray tube 40, under the scan control of the scan signal source 12.1. Thus an observer will be able to observe the data pattern which is being written into the storage screen 32 from a data handling system and, by connecting the write scan line 13.1 to the scan signal source 12.1 the observer will be able at will to take over control of the writing function and make an alteration in the stored data pattern. FIG. 4A shows a simple modification of FIG. 4 to include a switch 13.15 in the write scan line 13.1 following the delay means 13.5. The switch has a first contact 13.16 connected to the delay means 13.5 and a second contact 13.17 connected to a line 13.18 which is connected to the scan signal source (not shown) of such a data handling system.

It will be further appreciated that two or more storage means may be employed, and that an observer may place modified data on a storage means separate from the storage means under observation, so that the stored data under observation and the modified stored data may be simultaneously observed and compared. This will enable the observer to compare an existing stored data pattern with a new stored data pattern which he is considering before deciding on the precise change desired to be made in the existing pattern. Thus, for example, if an observer is supervising information as it passes through a computer, he will be able to consider a change before imposing it upon the computer program or data storage pattern. It will, of course, be understood that data can be read out of the storage means, such as the storage tube 30 via the read beam 37, into subsequent stages of a computer, for example, by means (not shown) which will couple the read beam line 13.2 (FIG. 4) to such subsequent stages, either in parallel with or alternative to the display device 40. If two storage means are employed, one may have such an alternative readout connection, while the other is connected constantly to a display device. If only one storage means is employed, then the parallel readout connection will enable continuous observation of data passing through the computer, for example, the arrangement of FIG. 4A being useful for switching the write beam line 13.1 from the computer to the observer's control when it is desired to alter the observed data pattern.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. A system for modifying stored data comprising, signal storage means having a plurality of signal storage loci, signal write means adapted to scan said loci in a time sequence, write signal input terminal means and erase signal input terminal means, a two-dimensional visual display device having a display area and display-scanning means adapted to scan increments of said area in a time sequence, means operatively interconnecting said storage means with said display-scanning means, detector means adjustable to detect the presence of said display-scanning means at a discrete element of said display area, and means operatively interconnecting said detector means optionally directly with one or the other of said write signal input terminal means or said erase signal input terminal means whereby optionally to establish or erase a signal in said storage means in one or more loci corresponding to said discrete element.

2. A system for modifying stored data comprising, signal storage means having a plurality of signal storage loci, signal write means adapted to scan said loci in a time sequence, signal read means adapted to scan said loci in a time sequence, write signal input terminal means and erase signal input terminal means, a two-dimensional visual display device having a display area and display scanning means adapted to scan increments of said area in a time sequence, means coupling said signal storage means with said display-scanning means, means adapted simultaneously and synchronously to scan said signal read means over said loci and said display-scanning means over said display area, whereby to present visually in said display area data stored in said storage means, detector means adjustable to detect the presence of said display-scanning means at a discrete element of said display area, and means operatively interconnecting said detector means optionally directly with one or the other of said write signal input terminal means or said erase signal input terminal means whereby optionally to establish or erase a signal in said storage means in one or more loci corresponding to said discrete element, whereby to modify said data.

3. A system for modifying stored data comprising, signal storage means having a plurality of signal storage loci, signal write means adapted to scan said loci in a time sequence, write signal input terminal means and erase signal input terminal means, a two-dimensional visual display device having a display area and display-scanning means adapted to scan increments of said area in a time sequence, means operatively interconnecting said storage means with said display scanning means, means adapted synchronously to scan said signal write means over said loci and said display-scanning means over said display area, detector means adjustable to detect the presence of said display-scanning means at a discrete element of said display area, and means operatively interconnecting said detector means optionally directly with one or the other of said write signal input terminal means or said erase signal input terminal means whereby optionally to establish or erase a signal in said storage means in one or more loci corresponding to said discrete element.

4. A system for modifying stored data comprising signal storage means having a plurality of signal storage loci, signal write means adapted to scan said loci in a time sequence, signal read means adapted to scan said loci in a time sequence, write signal input terminal means and erase signal input terminal means, a two-dimensional visual display device having a display area and display-scanning means adapted to scan increments of said area in a time sequence, means coupling said signal storage means with said display-scanning means, means adapted simultaneously and synchronously to scan said signal read means and said signal write means over said loci and said display-scanning means over said display area, whereby to present visually in said display area data stored in said storage means, detector means adjustable to detect the presence of said display-scanning means at a discrete element of said display area, and means operatively interconnecting said detector means optionally directly with one or the other of said write signal input terminal means or said erase signal input terminal means whereby optionally to establish or erase a signal in said storage means in one or more loci corresponding to said discrete element, whereby to modify said data.

5. A system for modifying stored data comprising, signal storage means having a plurality of signal storage loci, signal write means adapted to scan said loci in a time sequence, signal read means adapted to scan said loci in a time sequence, write signal input terminal means and erase signal input terminal means, a two-dimensional visual display device having a display area and display-scanning means adapted to scan increments of said area in a time sequence, means coupling said signal storage means with said display-scanning means, means adapted simultaneously and synchronously to scan said signal read means over said loci and said display-scanning means over said display area, whereby to present visually in said display area data stored in said storage means, detector means adjustable to detect the presence of said display-scanning means at a first discrete element of said display area, means operatively interconnecting said detector means optionally directly with one or the other of said write signal input terminal means or said erase signal input terminal means whereby optionally to establish or erase a signal in said storage means in one or more loci corresponding to said discrete element and a prescribed time interval following the presence of said display-scanning means at said discrete element, said time interval corresponding substantially to the time required for generating a signal in said detector means and transferring the same to said write means, and means to compensate for the delay due to said time interval to provide that upon readout from said storage means into said display means said signal will appear at said first discrete element in said display area.

6. System according to claim 5 in which said signal write means and signal read means are adapted simultaneously to scan the same loci, and said detector means includes an aiming means for selecting said first discrete element, said aiming means being so arranged that when it selects said first increment said detector responds to presence of said display-scanning means at a second increment of said display area which is reached by said display-scanning means substantially said time interval prior to reaching said first discrete element.

7. System according to claim 5 in which said write means is adapted to follow substantially said time interval behind said read means in scanning said storage means.

8. A system for modifying stored data comprising, signal storage means having a plurality of signal storage loci, signal write means adapted to scan said loci in a time sequence, write signal input terminal means and erase signal input terminal means, a cathode ray tube device having a display screen and scanning beam means adapted to scan increments of said screen in a time sequence, means operatively interconnecting said storage means with said beam means, detector means adjustable to detect the presence of said scanning means at a discrete element of said screen, and means operatively interconnecting said detector means optionally directly with one or the other of said write signal input terminal means or said erase signal input terminal means whereby optionally to establish or erase a signal in said storage means in one or more loci corresponding to said discrete element.

9. A system for modifying stored data comprising, signal storage means having a plurality of signal storage loci, signal write means adapted to scan said loci in a time sequence, signal read means adapted to scan said loci on a time sequence, write signal input terminal means and erase signal input terminal means, a cathode ray tube display device having a display screen and scanning beam means adapted to scan increments of said screen in a time sequence, means coupling said signal storage means with said scanning beam means, means adapted simultaneously and synchronously to scan said signal read means over said loci and said scanning beam means over said screen, whereby to present visually in said screen data stored in said storage means, detector means adjustable to detect the presence of said scanning beam means at a discrete element of said screen, and means operatively interconnecting said detector means optionally directly with one or the other of said write signal input terminal means or said erase signal input terminal means whereby optionally to establish or erase a signal in said storage means in one or more loci corresponding to said discrete element, whereby to modify said data.

10. A system for modifying stored data comprising, signal storage means having a plurality of signal storage loci, signal write means adapted to scan said loci in a time sequence, write signal input terminal means and erase signal input terminal means, a cathode ray tube display device having a display screen and scanning beam means adapted to scan increments of said screen in a time sequence, means operatively interconnecting said storage means with said beam means, means adapted synchronously to scan said signal write means over said loci and said scanning beam means over said screen, detector means adjustable to detect the presence of said scanning beam means at a discrete element of said screen, and means operatively interconnecting said detector means optionally directly with one or the other of said write signal input terminal means or said erase signal input terminal means whereby optionally to establish or erase a signal in said storage means in one or more loci corresponding to said discrete element.

11. A system for modifying stored data comprising, signal storage tube means having a storage screen on which there are a plurality of signal storage loci, signal write means adapted to scan said loci in a time sequence, write signal input terminal means and erase signal input terminal means, a two-dimensional visual display device having a display area and display-scanning means adapted to scan increments of said area in a time sequence, means operatively interconnecting said storage screen with said display-scanning means, detector means adjustable to detect the presence of said display-scanning means at a discrete element of said display area, and means operatively interconnecting said detector means optionally directly with one or the other of said write signal input terminal means or said erase signal input terminal means whereby optionally to establish or erase a signal on said storage screen in one or more loci corresponding to said discrete element.

12. A system for modifying stored data comprising, signal storage tube means having a storage screen on which there are a plurality of signal storage loci, signal write means adapted to scan said loci in a time sequence, signal read means adapted to scan said loci in a time sequence, write signal input terminal means and erase signal input terminal means, a two-dimensional visual display device having a display area and display-scanning means adapted to scan increments of said area in a time sequence, means coupling said storage screen with said display-scanning means, means simultaneously and synchronously to scan said signal read means over said loci and said display-scanning means over said display area, whereby to present visually in said display area data stored in said storage screen, detector means adjustable to detect the presence of said display-scanning means at a discrete element of said display area, and means operatively interconnecting said detector means optionally directly with one or the other of said write signal input terminal means or said erase signal input terminal means whereby optionally to establish or erase a signal in said storage screen in one or more loci corresponding to said discrete element, whereby to modify said data.

13. A system for modifying stored data comprising, signal storage tube means having a storage screen on which there are a plurality of signal storage loci, signal write means adapted to scan said loci in a time sequence, write signal input terminal means and erase signal input terminal means, a two-dimensional visual display device having a display area and display-scanning means adapted to scan increments of said area in a time sequence, means operatively interconnecting said storage screen with said display-scanning means, means adapted synchronously to scan said signal write means over said loci and said display-scanning means over said display area, detector means adjustable to detect the presence of said display-scanning means at a discrete element of said display area, and means operatively interconnecting said detector means optionally directly with one or the other of said write signal input terminal means or said erase signal input terminal means whereby optionally to establish or erase a signal in said storage screen in one or more loci corresponding to said discrete element.

14. In a visual information display system having a two-dimensional display device characterized by a display area and display scanning means adapted to scan increments of said area in a time sequence, a system for optionally marking or erasing a discrete increment of said display area comprising, said display device, signal storage means having a plurality of signal storage loci, write means adapted to scan said signal storage loci in a time sequence, said signal storage means having write signal input terminal means and erase signal input terminal means, detector means adjustable to detect the presence of said display scanning means at a discrete element of said display area, means operatively interconnecting said detector means optionally directly with one or the other of said write signal input terminal means or said erase signal input terminal means whereby optionally to establish or erase a signal in said storage means in one or more loci corresponding to said discrete element of said display area, and means operatively interconnecting said storage means with said display scanning means.

15. In a visual information display system having a two-dimensional display device characterized by a display area and display scanning means adapted to scan increments of said area in a time sequence, a system for optionally marking or erasing a discrete increment of said display area comprising, said display device, signal storage means having a plurality of signal storage loci, write means adapted to scan said signal storage loci in a time sequence, read means adapted to scan said loci in a time sequence, said signal storage means having write signal input terminal means and erase signal input terminal means, detector means adjustable to detect the presence of said display scanning means at a discrete element of said display area, means operatively interconnecting said detector means optionally directly with one or the other of said write signal input terminal means or said erase signal input terminal means whereby optionally to establish or erase a signal in said storage means in one or more loci corresponding to said discrete element of said display area, and means operatively interconnecting said read means with said display scanning means.

16. In a visual information display system having a cathode ray tube display device characterized by a display screen, a scannable beam and beam scanning means adapted to scan increments of said screen in a time sequence, a system for optionally marking or erasing a discrete increment of said display screen comprising, said display device, signal storage tube means having a storage screen on which there are a plurality of signal storage loci, write means adapted to scan said signal storage loci in a time sequence, said tube having write signal input terminal means and erase signal input terminal means, detector means adjustable to detect the presence of said beam at a discrete element of said display area, means operatively interconnecting said detector means optionally directly with one or the other of said write signal input terminal means or said erase signal input terminal means whereby optionally to establish or erase a signal on said storage screen in one or more loci corresponding to said discrete element of said display screen, read means in said storage tube means adapted to scan said storage screen in a time sequence, means synchronizing said read means and said beam scanning means for simultaneous scanning of corresponding points of said storage screen and said display screen respectively, and means operatively interconnecting said storage screen with said beam scanning means for presenting on said display screen a replica of the data pattern on said storage screen.

17. A system for modifying stored data comprising, signal storage means having a plurality of signal storage loci, signal write means adapted to scan said loci in a time sequence, signal read means adapted to scan said loci in a time sequence, a two-dimensional visual display device having a display area and display-scanning means adapted to scan increments of said area in a time sequence, means coupling said signal storage means with said display scanning means, means adapted simultaneously and synchronously to scan said signal read means over said loci and said display-scanning means over said display area, whereby to present visually in said display area data stored in said storage means, detector means adjustable to detect the presence of said display-scanning means at a first discrete element of said display area, means operatively interconnecting said detector means with said write means to establish a signal in said storage means in one or more loci corresponding to said discrete element and a prescribed time interval following the presence of said display-scanning means at said discrete element, said time interval corresponding substantially to the time required for generating a signal in said detector means and transferring the same to said write means, and means to compensate for the delay due to said time interval to provide that upon readout from said storage means into said display means said signal will appear at said first discrete element in said display area.

18. System according to claim 17 in which said signal write means and signal read means are adapted simultaneously to scan the same loci, and said detector means includes an aiming means for selecting said first discrete element, said aiming means being so arranged that when it selects said first increment said detector responds to presence of said display-scanning means at a second increment of said display area which is reached by said display-scanning means substantially said time interval prior to reaching said first discrete element.

19. System according to claim 17 in which said write means is adapted to follow substantially said time interval behind said read means in scanning said storage means.

References Cited by the Examiner

UNITED STATES PATENTS

| | | | |
|---|---|---|---|
| 2,613,263 | 10/52 | Hilburn | 178—7.2 |
| 2,816,246 | 12/57 | Bliss | 315—10 |
| 2,849,707 | 8/58 | White | 343—7.3 |
| 2,855,589 | 10/58 | Baker et al. | 343—7.7 |
| 2,903,598 | 9/59 | Hoover, Jr. | 250—65 |
| 2,903,690 | 9/59 | Slack | 343—5 |
| 2,915,643 | 12/59 | Mork | 250—17 |

NEIL C. READ, *Primary Examiner.*

ARCHIE R. BORCHELT, *Examiner.*